(No Model.) 3 Sheets—Sheet 2.
G. HENKEL.
HOISTING MACHINE.
No. 324,690. Patented Aug 18, 1885.
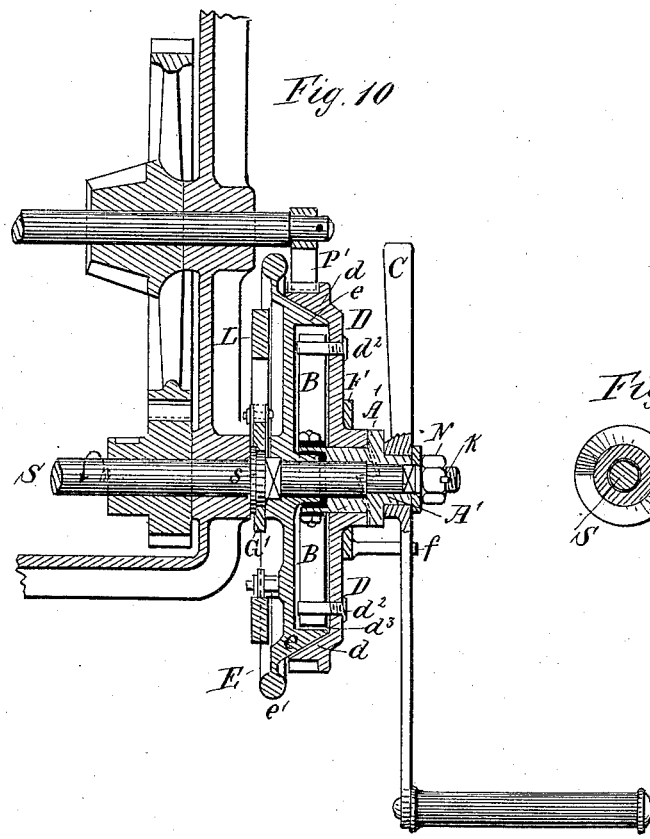
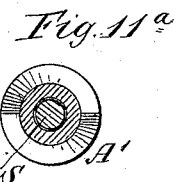
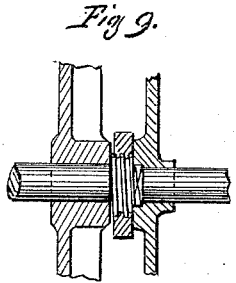
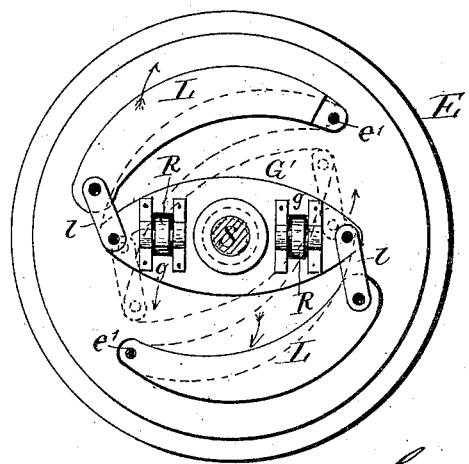
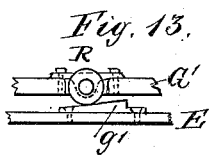
Witnesses
P. M. Knobloch
W. C. Poulter
Inventor
Gustav Henkel
Mr Henry Orth
his att'y (No Model.) 3 Sheets—Sheet 3.
G. HENKEL.
HOISTING MACHINE.
No. 324,690. Patented Aug. 18, 1885.
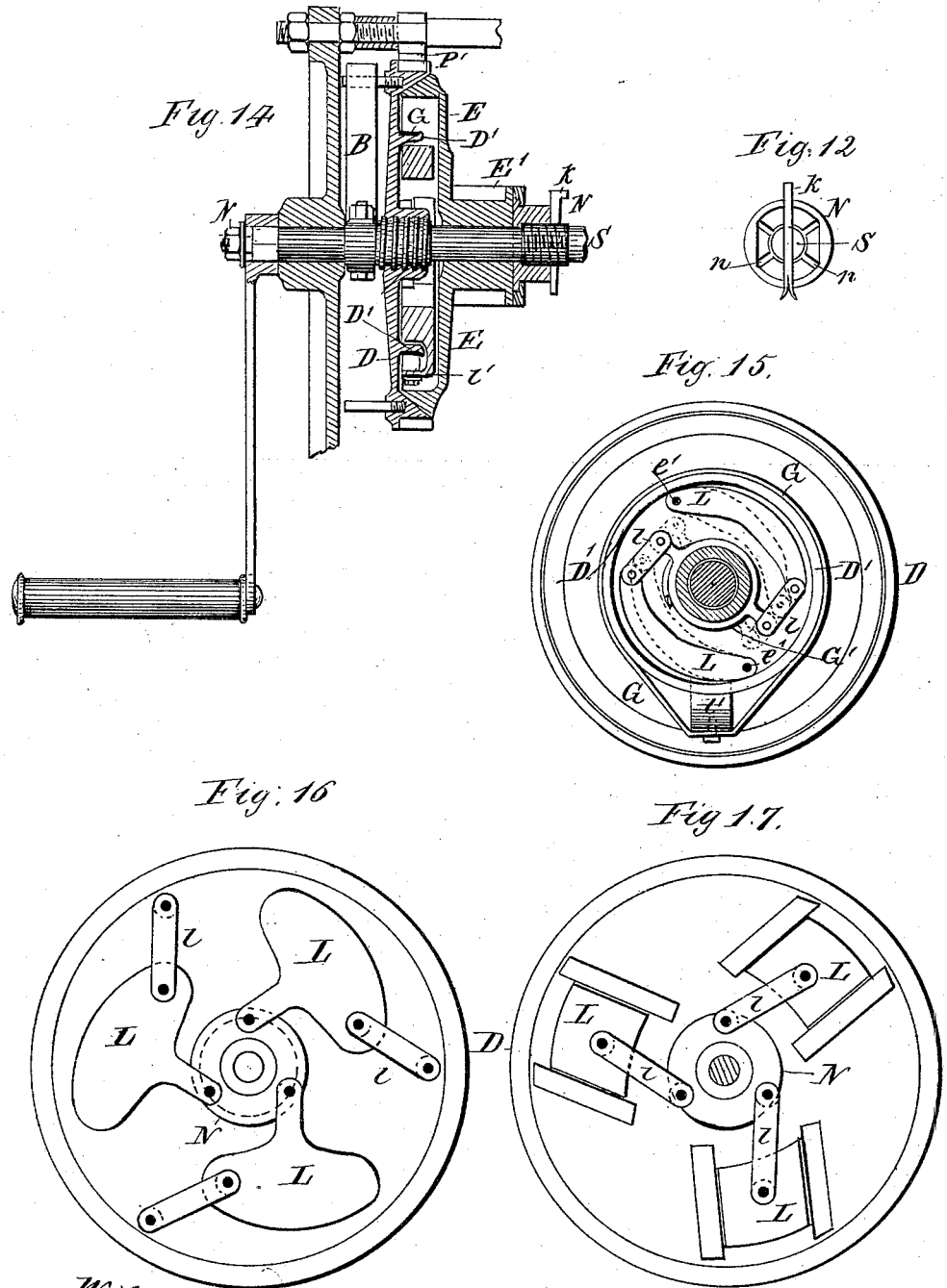

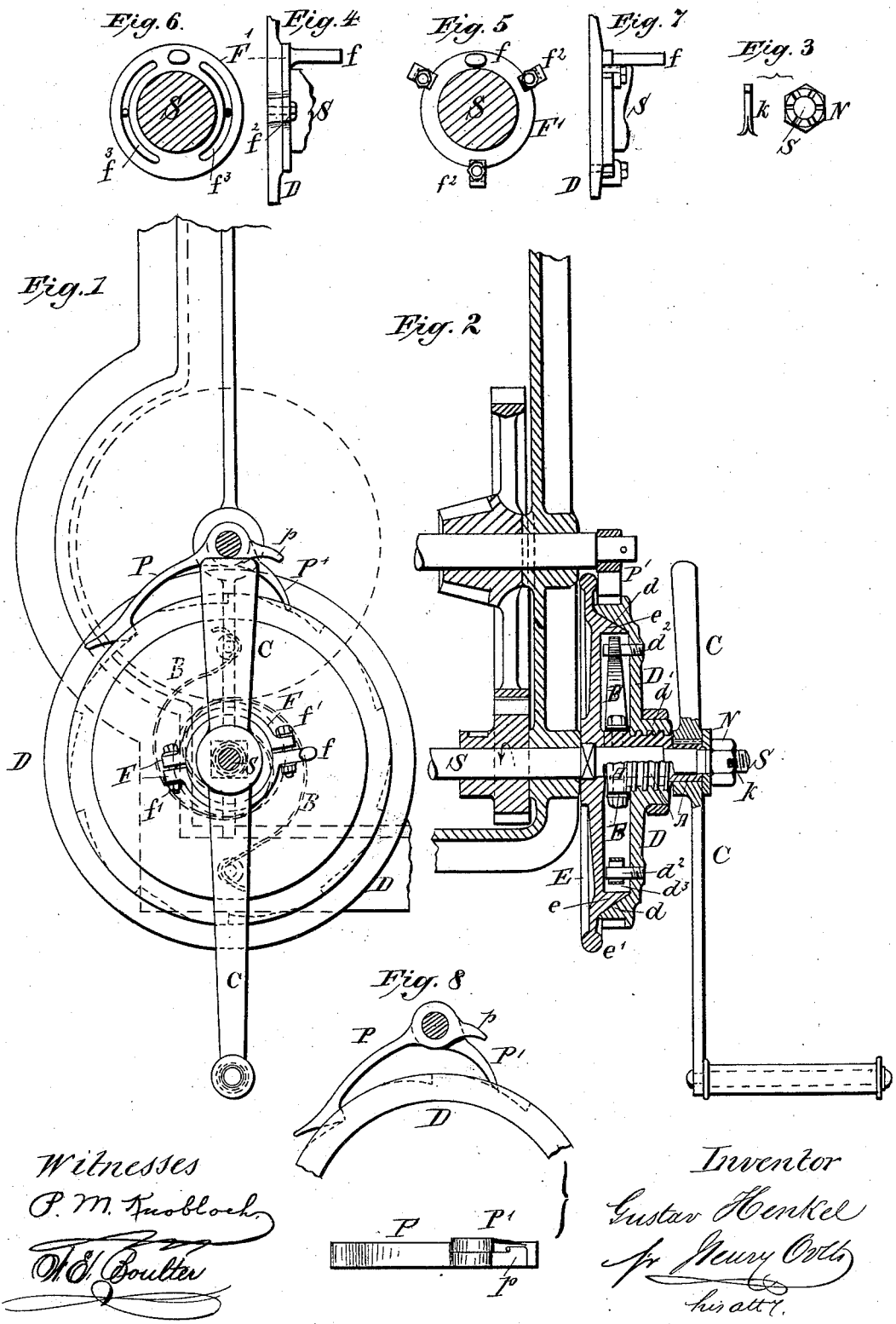

UNITED STATES PATENT OFFICE.

GUSTAV HENKEL, OF CASSEL, PRUSSIA, GERMANY.

HOISTING-MACHINE.

SPECIFICATION forming part of Letters Patent No. 324,690, dated August 18, 1885.

Application filed April 21, 1885. (No model.) Patented in England April 2, 1885, No. 4,192, and in Belgium April 2, 1885, No. 68,397.

*To all whom it may concern:*

Be it known that I, GUSTAV HENKEL, a subject of the King of Prussia, residing at Cassel, Prussia, German Empire, have invented certain new and useful Improvements in Hoisting-Machinery; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to friction driving-gears, more especially adapted for hoisting-engines, though it may be applied to and used in conjunction with other engines or machines.

The object of my invention is to provide means whereby a shaft may be automatically thrown in or out of gear with the driving-power by rotating the shaft in one or the other direction, and, further, to provide means whereby the rotation of said shaft when thrown out of gear with the driving-power may be automatically arrested or the speed thereof checked; and the invention consists, essentially, in the combination, with the hoisting or driving shaft, of a friction-coupling so combined that when power is applied to rotate the shaft in one direction the coupling of the friction devices will be automatically effected, and that when the shaft is rotated in a reverse direction by power applied thereto or under the weight of the load suspended therefrom the uncoupling of the friction devices will also take place automatically, substantially as hereinafter fully described.

It further consists in the combination, with the friction-coupling, of a brake so arranged that in case the application of power to rotate the shaft in one direction should suddenly cease the said shaft will be held against rotation in a reverse direction under the weight of the load, or other impulse, or power, tending to rotate said shaft in said reverse direction, substantially as hereinafter fully described.

For convenience of description and to avoid confusion, I will describe my invention in its application to hoisting-machines, and will refer to that direction of rotation of the hoisting-shaft by which the load is raised as "positive rotation," and that by which the load is lowered as "negative rotation." It will of course be understood that I do not confine myself in the application and use of the invention to hoisting-engines only, as it may be applied to and used with other engines, machines, or apparatus; nor do I confine myself to the combination, with the friction-gear, of a safety-brake, as such gear may be employed without the brake.

In practice the means employed for attaining the objects of my invention may be variously modified without departing from the spirit of my invention, as will hereinafter more fully appear, and as shown in the accompanying drawings, in which—

Figures 1 and 2 show, respectively, by an elevation and a vertical section so much of a hoisting-engine as will be necessary to illustrate the invention. Figs. 3, 4, 5, 6, 7, 8, and 9 are detail views thereof. Fig. 10 is a view, similar to Fig. 2, showing a modification in the arrangement of the friction-coupling and the brake mechanism. Fig. 11 shows said devices in elevation, looking in the direction of arrow 1, Fig. 10, the hoisting-shaft being shown in section. Figs. 11$^a$, 12, and 13 are detail views thereof. Fig. 14 is a vertical section showing a further modification in the arrangement of the friction-coupling and brake mechanism. Fig. 15 is a face view, looking in the direction of arrow 2, Fig. 14, of the friction disk or wheel D, showing the arrangement of brake mechanism; and Figs. 16 and 17 illustrate the friction-disk D by an elevation and on a slightly enlarged scale, showing further modifications in the brake mechanism.

Like letters of reference indicate like parts wherever such may occur in the above figures of drawings.

S is the hoisting-shaft, the driving-crank C of which is keyed or otherwise rigidly secured to a sleeve, A, that is loosely mounted on one end of said shaft S. The sleeve is held against endwise movement in one direction, here against the right or outer end of the shaft, by means of a nut, N, and a key, $k$, and said sleeve is screw-threaded exteriorly and works in the correspondingly-threaded hub $d'$ of a friction wheel or disk, D. Upon shaft S in rear of the sleeve A is rigidly mounted a second friction wheel or disk, E, both disks having annular flanges d e, respectively, which constitute the contacting or frictional surfaces whereby the disk E and shaft S are rotated by frictional contact with each other when disk D is rotated by crank C or when said disk is actuated by the safety-brake, as hereinafter described.

As above described, the sleeve A is screw-threaded exteriorly and the hub of disk D is screw-threaded interiorly, so that when it is desired to rotate the shaft positively the crank C is rotated in the proper direction, and the rotation of the latter will carry the disk D in frictional contact with the disk E—that is to say, by the rotation of the crank the disk D is screwed up to the disk E, and it is obvious that the greater the power applied to the crank the greater will be the frictional contact between the surfaces $d$ and $e$ of the disks D and E, respectively.

It is further obvious that by rotating the crank C in a reverse direction the disk D will move away from disk E, and the frictional contact will be lessened or entirely interrupted, so that the load suspended from the shaft may be gradually lowered or removed therefrom.

In order to check the speed or arrest the rotation of the shaft, should the disks be thrown out of gear accidentally while a load is being raised, or the power or crank to raise the load cease to act thereon, I employ, as shown in Figs. 1 and 2, two springs, B, one end of which is secured to the hub $d'$ of disk D, and the other or free end bears upon lugs or pins $d^2$, projecting from disk D toward disk E, said springs being located in the space $d^3$, formed by and between the disks or wheels D E, as plainly shown in Figs. 2, 10, and 14. The tendency of these springs is to actuate or rotate the disk D, so as to cause it to move toward and engage the frictional surface of disk E with sufficient force to check the backward or negative rotation of the disk E, and with it that of the shaft S, the disk D being held against such rotation by pawls P and P', as above set forth.

If power is now again applied to the crank C to rotate the shaft S in a positive direction, the disk D will be moved into more intimate contact with disk E until the friction between their surfaces $d$ and $e$ is such that said disk D will carry the disk E along with it. The reverse of this takes place when the crank C is rotated in the reverse or negative direction, the frictional contact between the surfaces $d$ and $e$ diminishing, the disk E being free to rotate and lower the load. Should the crank C be accidentally released, it will, under the stress of the springs B, be rotated in the positive direction and carry the disk D again into frictional engagement with the disk E.

To rotate the shaft in a positive direction when no load is suspended therefrom, the disks are thrown out of engagement, as described, and the disk E used as a hand-wheel, said disk being provided with a suitable hand flange or rim, $e'$, for the purpose as shown.

To limit the rotation of the crank C when actuated by the springs B, I provide a stop, $f$, adjustable upon the hub $d'$ of the disk D, said stop $f$ being formed on one of two half-rings, F, clamped upon the hub by means of bolts $f'$, as shown in Figs. 1 and 2.

Instead of the two half-rings F, a whole ring, F', Figs. 4 and 5, having lugs or ears $f^2$, adapted to be bolted to corresponding lugs formed on the hub of the disk D, may be employed, or a ring, F', having segmental slots $f^3$, adapted for adjustment on the face of the disk or on a flange formed on the hub thereof by means of bolts projecting therefrom, may be employed, as shown in Figs. 6 and 7. In either case the stop $f$ is formed on or rigidly secured to the ring and projects outward into the path of the crank-handle.

The backward or negative rotation of the disk D is prevented by means of the usual pawl and ratchet locking devices.

To guard against accidents, which may result from the accidental breakage of the locking pawl, or in case the crank is thrown around by reason of a failure of the pawl to act properly, I provide two locking-pawls, P and P', Figs. 1, 8, and 9, the one acting positively, the other negatively. The hub of the pawl P has an arm, $p$, projecting therefrom, which lies in a recess formed in the hub of the pawl P', Figs. 8 and 9, so that one of the pawls is in constant engagement with the ratchet-teeth on the periphery of the disk D. The two pawls are of varying length, whereby the same effect is obtained as if the disk were provided with twice the number of teeth.

Instead of employing a screw-threaded sleeve, A, working in a correspondingly-threaded hub, $d'$, of the disk D, a sleeve, A', having spirally inclined or clutch faces $a'$, Figs. 10 and 11ª, engaging corresponding spirally inclined or clutch faces of the hub $d'$ of the disk D, may be employed and the same results obtained, as will be readily understood.

The sleeve A may also, if desired, be entirely dispensed with, and the shaft S may be screw-threaded, as shown in Fig. 14, and in this case the disk E may have a toothed hub, E', or a toothed wheel may be secured thereto and its rotation transmitted thereby to other devices.

It is obvious, also, that instead of a screw-threaded shaft, S, working in a threaded hub of disk D, Fig. 14, a shaft having spirally inclined or clutch faces working in conjunction with corresponding faces formed in or on the hub of disk D, as shown in Figs. 10 and 11ª, may be employed to displace the disk longitudinally of the shaft.

The adjustable bearing-nut N is here, Fig. 14, applied to the shaft in rear of disk E, said nut being provided with radial grooves $n$ for the reception of the key $k$, so that the nut may be adjusted on the shaft S in radii of sixty degrees, as also shown in Fig. 3.

It is obvious that as the crank is rigidly secured to the sleeve A, the tension of the springs B may be adjusted, as well as the degree of frictional contact between the disks D and E by adjusting the nut N on the end of the shaft S, against which nut the crank bears.

In Figs. 10, 11, 14, and 15 I have also shown a further modification in the arrangement and construction of safety-brake. The brake shown in Figs. 10 and 11 is brought into operation as soon as the speed of the shaft S in a negative direction increases beyond a normal or given rate of speed, whereby the disk E is moved toward the disk D, and their friction-surfaces brought into contact to check and arrest the movement of shaft S. In Figs. 14 and 15 this is effected by a band or strap, G, operating on disk D.

The displacement of the disk E in Figs. 10 and 11 takes place through the instrumentality of the following devices: G′ is a cross-head that is mounted on shaft S and bears against an annular flange, s, thereof. At its ends the cross-head G′ is connected by links l with one end of a weight or weighted lever, L, (of which there are two shown,) whose other end is pivoted on studs e′, projecting from disk E. Under the stress of springs (not shown in the drawings) the weights L are held in their normal position. (Shown in dotted lines in Fig. 11.)

Should the speed of rotation of the shaft S in the negative direction—that is, in the direction of the arrow, Fig. 10—increase beyond a certain maximum speed, the weights or levers L, under the influence of the centrifugal force of disk E, are moved outwardly in the direction of the arrows, Fig. 11, to the position in which they are shown in full lines in said figure, thereby imparting a partial rotation to the cross-head G′. During the latter movement of the cross-head G′ the rollers R, pivoted in suitable bearings, g, formed on or secured to the cross-head G′ and projecting through slots in said cross-head, are caused to ride up inclines g′, Fig. 13, on the face of the disk E, and carry the latter into frictional engagement with the disk D. The same result may be obtained an! the rollers and inclines dispensed with by screw-threading that part of the shaft on which the cross-head is mounted and correspondingly screw-threading the opening in said cross head, so that a partial rotation thereof will cause it to be displaced longitudinally of the shaft, and thereby carry the disk F into frictional engagement with the disk D, the same as by means of the threaded hub and shaft referred to in respect of Figs. 1 and 2, and as shown in detail, Fig. 12.

This automatic brake may also be used without the crank, in which case the disk D is secured against rotation and longitudinal displacement with and on the shaft by rigidly connecting said disk with a stationary portion of the engine.

In the automatic brake shown in Figs. 14 and 15 the cross-head G′ serves only to connect the weights or levers L, pivoted at e′ to disk E by means of links l, as in Figs. 10 and 11. The levers here are so arranged as to act upon a band or strap, G, one of said levers having an arm or projection, l′, that bears against the strap and tightens the same on an annular flange, D′, formed on the face of disk D. It is obvious that the arrangement may be such that the brake-band will be applied to the inner instead of the outer periphery of the flange D′. Inasmuch as the disk D is held against negative rotation by the locking-pawls P P′, the outward movement of the levers L, and consequent tension of the band G, act to arrest the movement of the disk E and shaft S. In all other respects the mechanism shown in Figs. 10, 11, 14, and 15 operate alike.

Instead of providing inclined or truncoconical friction-surfaces, plane or corrugated friction-disks may be employed without thereby changing the nature of the invention.

Instead of two weights or weighted levers L, a greater number of such may be employed, as in Fig. 16, in which three such weights are shown; and instead of levers or weights oscillating on a pivot, these may be arranged to reciprocate in suitable guides, as shown in Fig. 17.

When more than two levers are employed, a ring, N, instead of a cross head, G, is preferably employed, as shown in said Figs. 16 and 17.

Having now described my invention, what I claim is—

1. The combination, substantially as described, with a rotary shaft and a friction-disk or wheel rigidly mounted thereon, of a second friction disk or wheel arranged to rotate with and move on spiral or inclined planes endwise on the shaft, and a locking-pawl to lock the latter disk against backward movement, whereby on the backward rotation of the shaft the latter disk is automatically moved into engagement with the former disk, for the purpose specified.

2. The combination, substantially as described, with a rotary shaft and a friction disk or wheel rigidly mounted thereon, of a friction disk or wheel movable endwise on the shaft, a locking-pawl to lock the latter disk against backward rotation, and an operating-crank acting upon the latter disk to move it into or out of frictional engagement with the former disk according to the direction of rotation of the crank, for the purpose specified.

3. The combination, substantially as described, with a rotary shaft and a friction disk or wheel rigidly secured thereto, of a friction disk or wheel movable endwise on the shaft, a locking-pawl to lock the same against backward movement, and springs acting upon said disk to move it into frictional contact with the former disk when said shaft is rotated backward, for the purpose specified.

4. The combination, substantially as described, with a rotary shaft and a friction disk or wheel rigidly mounted thereon, of a second friction disk or wheel arranged to rotate with and move on spiral or inclined planes endwise on the shaft, and springs arranged to operate on the latter disk and move it into frictional engagement with the former disk, and adjusting-nut N and key k, to regulate the tension of the springs and the degree of the frictional contact between said disks, for the purpose specified.

5. The combination, substantially as described, with the disk D, of the locking-pawls P and P', of varying length, the hub of pawl P having an arm or extension operating on pawl P', for the purpose specified.

6. The combination, substantially as described, with a rotary shaft, a friction-disk rigidly connected therewith, a second friction disk arranged to rotate with and move on spiral or inclined planes endwise on said shaft, a locking-pawl to lock the same against backward rotation, springs exerting their power on said disk to move the same toward the former disk on the backward rotation of the shaft, and an adjustable stop connected with the endwise movable disk, of the operating-crank for rotating the shaft, for the purpose specified.

7. The combination, substantially as described, with a rotary shaft, a friction-disk rigidly connected therewith, a second friction-disk arranged to rotate with and move on spiral or inclined planes endwise on said shaft, a locking-pawl to lock the same against backward rotation, and springs exerting their power on said disk to move the same toward the former disk on the backward rotation of the shaft, of an automatic speed-brake operated by the centrifugal force exerted upon weights or weighted levers connected with one of the disks to check or arrest the rotation of the other disk and that of the shaft by carrying said disks into contact, as and for the purpose specified.

8. The combination, substantially as described, with a rotary shaft, a friction-disk rigidly connected therewith, a second friction-disk arranged to rotate with and move on spiral or inclined planes endwise on said shaft, a locking-pawl to lock the same against backward rotation, and springs exerting their power on said disk to move the same toward the former disk on the backward rotation of the shaft, of an automatic speed-brake consisting of a brake-band applied by the centrifugal force of one of the disks acting upon a weight or weighted lever to apply the brake-band to the other disk and arrest its rotation and with it that of the shaft, as and for the purpose specified.

In testimony whereof I affix my signature in presence of two witnesses.

GUSTAV HENKEL.

Witnesses:
   A. DEMELIUS,
   B. ROI.